Feb. 28, 1967    J. W. SPENCER    3,306,427
LUMBER INVERTING APPARATUS
Filed June 7, 1966    2 Sheets-Sheet 1

INVENTOR.
John W. Spencer
BY
*B. B. Olm*
ATTORNEY

Feb. 28, 1967          J. W. SPENCER                3,306,427
                    LUMBER INVERTING APPARATUS
Filed June 7, 1966                              2 Sheets-Sheet 2

INVENTOR.
John W. Spencer
BY
ATTORNEY 3,306,427
LUMBER INVERTING APPARATUS
John W. Spencer, Route 1, Hillsborough, N.C. 27278
Filed June 7, 1966, Ser. No. 555,848
8 Claims. (Cl. 198—33)

This invention relates to a device for handling lumber and, more specifically, to a device which aids in the grading of lumber by presenting to view all sides of each individual board passing through the device.

Lumber which has been cut from logs is stacked in the form of books and is cured. Each book is taken to a grading station where the individual boards are shingled from the book and onto a conveyor. The conveyor is generally of the type having at least two chains arranged substantially perpendicular to the boards comprising the book so that the boards will be deposited on the conveyor in a transverse relationship. The boards are then transferred to a second conveyor where they individually pass by an inspector who observes and grades each oncoming board along its forward and upper surface whereupon the board falls into a V-shaped trough and is turned so that the prior bottom surface and backside may be observed by the inspector. Quite commonly, the board is not turned to present its bottom surface when falling into the V-trough and it must then be manually inverted. The failure of the board to tip over as it enters the V-trough is generally attributed to its thickness for as the board topples into the V-trough its leading edge strikes the far side thereof and prevents the same from flipping over.

Several mechanical devices have been devised which invert a board by means of mechanical fingers or the like; however, devices of this type generally cover a portion of the board and prevent the observer from having an obstructed view thereof.

Therefore, it is an object of this invention to provide an apparatus for inverting boards which enables an observer to have an unobstructed view thereof for the purpose of locating thins, culls and tapers in the board.

Another object of this invention is to provide a board inverting apparatus which is adapted to turn a board of almost any thickness without hiding from view any portions of the board being observed.

A further object of this invention is to provide a board inverting apparatus with a cam operable arm which accelerates relative to the board being turned so as to cause the board to be tipped from its position of resting in the board inverting apparatus whereby the reverse side of the board is presented to the observer.

Still another object of this invention is to provide a board turning apparatus which is pneumatically operated and which is adapted to be incrementally controlled by the observer.

Other objects and advantages of the present invention will become apparent and immediately suggest themselves to those skilled in the art to which the invention is directed from a reading of the following specification in connection with the accompanying drawings, in which.

The lumber inverting apparatus of the invention is supported by a frame of a general type which is adapted to be placed in the assembly line of a lumber handling apparatus. The frame is provided with a transversely arranged shaft which is mounted near the top of the frame. The shaft rigidly receives a ratchet wheel and pivotally receives a pawl which is positioned adjacent the ratchet wheel and is adapted for turning the shaft by means of the ratchet wheel. The pawl has its free end connected to a double acting pneumatically actuated cylinder which is manually controlled by means of an operator positioned remote with respect to the same. The ends of the shaft are provided with star wheel mechanisms which are adapted to receive and invert a board which is presented thereto by a pair of board carrying chains. The star wheel mechanism stops the board which temporarily slides on the carrying chains and lifts the board therefrom, inverts the same and replaces the board on the carrying chains in an up-side-down position. The star wheel mechanism includes a star wheel having a plurality of radially extending arms each of which defines a board receiving area and a plurality of cam operated arms cooperating with and pivotally mounted on each star wheel arm. Each cam operated arm is provided with a cam follower which resides in the track of a face groove cam. The face groove cam is stationarily mounted with respect to the frame and concentrically aligned with the shaft so that as the star wheel mechanism is rotated by the shaft, the cam followers are activated and move the cam operated arms forwardly and rearwardly with respect to their adjacent star wheel arms. The boards are loaded on the chains and are metered to the star wheel mechanism by means of a pneumatically operated stop device. The stop device includes a plurality of stakes which are fixedly mounted on the frame and are positioned adjacent respective chains of the conveyor. The stakes stop the boards while allowing the chains to continue to revolve and slide against the bottom surfaces of the boards resting against the stakes. Air cylinders are mounted directly beneath the chains and have on the free end of each respective piston rod a rotatably mounted pinion sprocket which meshingly engages the chain. Upon actuation of the air cylinders, each of the chains is raised to a position which is higher than the adjacent stakes by means of the pinion sprockets pushing upwardly thereagainst so that the selected board carried by the chains is adapted to clear the stakes and proceed onwardly to the star wheel mechanism.

The invention is illustrated in connection with the accompanying drawings, in which the figures are illustrative of the preferred embodiment of the invention.

Figure 1:
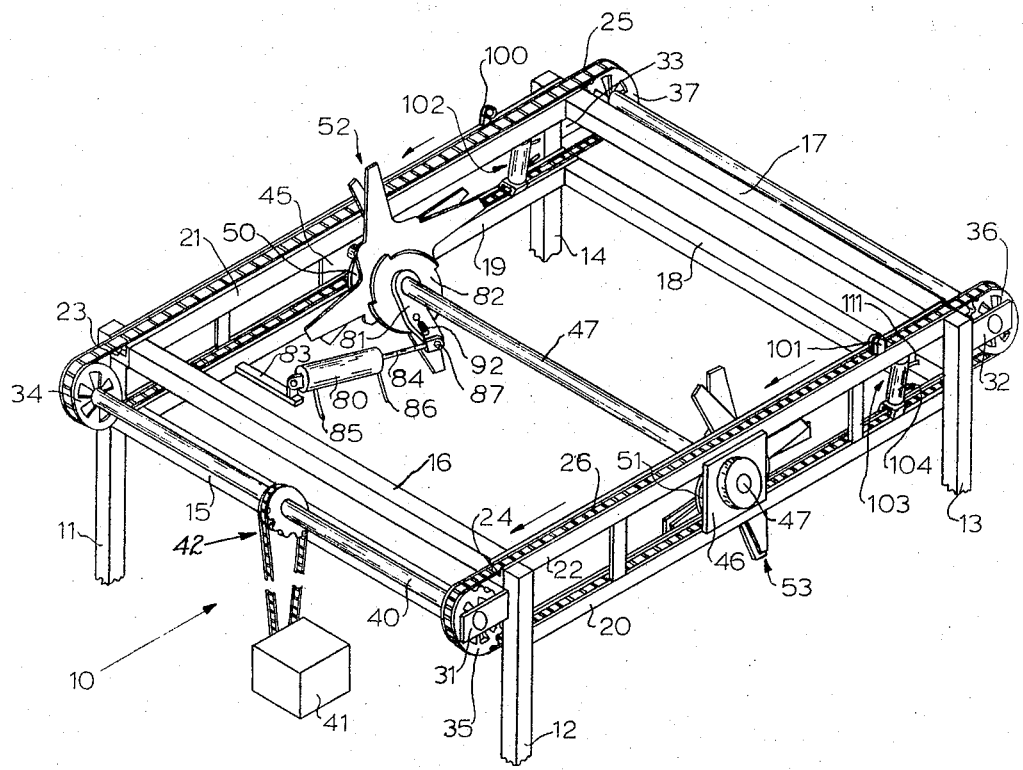
FIGURE 1 is a pictorial view of the apparatus showing the star wheel mechanisms and the metering device.
Figure 5:
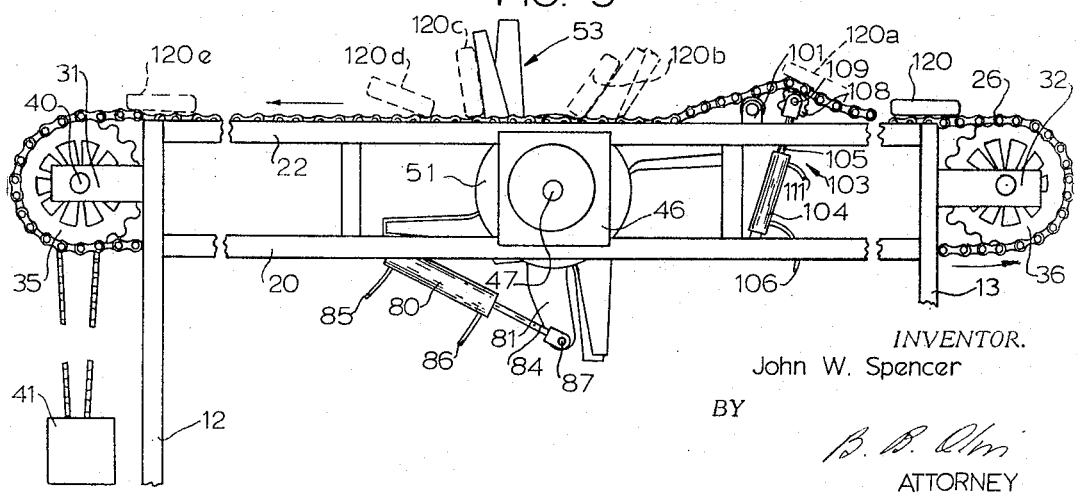
FIGURE 5 is an elevation view of the device showing the path through which a selected board travels while being lifted from the carrying chains and inverted by the star wheel mechanism.
Figure 2:
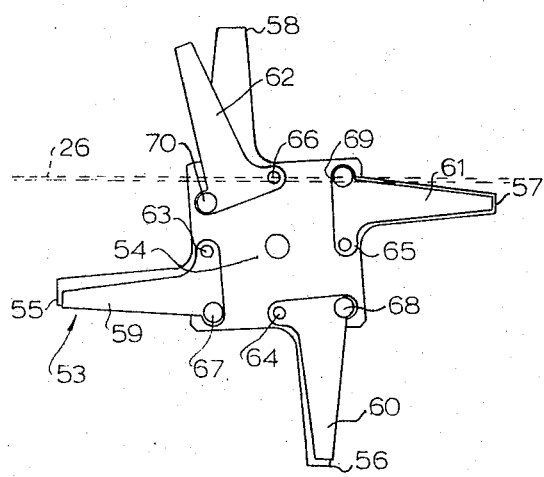
FIGURE 2 is an elevation view of the star wheel apparatus showing the star wheel arms and the cam operable arms which are mounted on respective star wheel arms and showing the various positions of the cam operable arms relative to the star wheel arms.
Figure 6:
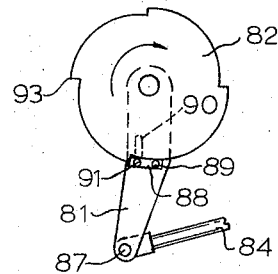
FIGURE 6 is an elevation view of the ratchet wheel and pawl which is used for driving the star wheel mechanisms.
Figure 3:
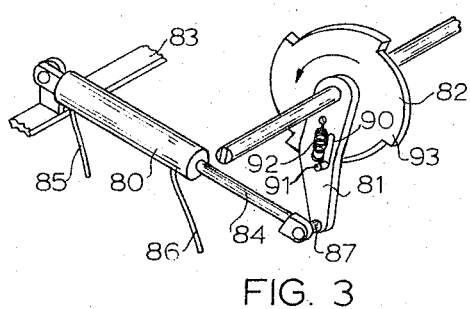
FIGURE 3 is a pictorial view of the energizing mechanism which includes an air cylinder operably connected to a ratchet and pawl mechanism.
Figure 7:
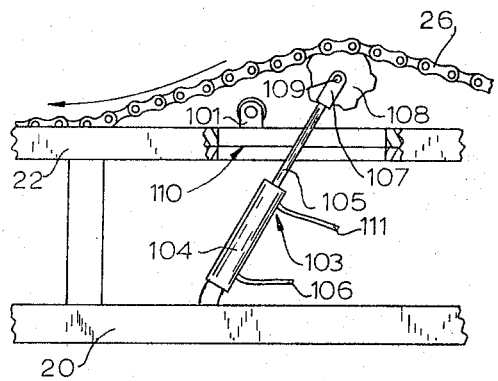
FIGURE 7 is an elevation view of the metering device showing the stop means and the chain lifting means mounted on the frame.
Figure 4:
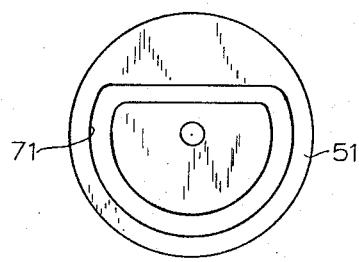
FIGURE 4 is an elevation view of the face groove cam which is used to actuate the cam operable arms.

A rectangular shaped frame 10 which is adapted to reside on the ground or some other surface for supporting the apparatus of the invention is comprised essentially of vertical legs 11, 12, 13 and 14. Vertical legs 11 and 12 are connected by lateral cross beams 15 and 16; vertical legs 12 and 13 are connected by longitudinal beam 20 and channel beam 22; vertical legs 13 and 14 are joined by lateral cross beams 17 and 18; and vertical legs 14 and 11 are joined by longitudinal beam 19 and channel beam 21. From FIGURE 1, it can be seen that the various interconnecting beams and legs form a composite rigid structural frame. Channel beams 21 and 22 which are positioned substantially on top of frame 10 are respectively provided with troughs 23 and 24 which are longitudinally positioned with and run the length thereof. Troughs 23 and 24 are adapted to partially house chains 25 and 26, respectively, and provide a track for the same so that the upper portions of chains 25 and 26 are above the upper levels of channel beams 21 and 22 and are adapted to support a board for the transportation thereof across the upper surfaces of frame 10. Chains 25 and 26 may be continuations of the chains for an entire lumber handling unit; however, the apparatus of this invention is adapted to house endless chains as shown in FIGURE 1 and to provide means for powering the chains. Thus, sprocket mounts 30, 31, 32 and 33 are rigidly secured to vertical beams 11, 12, 13 and 14, respectively, between channel members 21 and 22 and support beams 19 and 20. Sprocket mounts 30 (not shown), 31, 32 and 33 are respectively provided with sprockets 34, 35, 36 and 37 which are rotatably mounted thereon and which engage and support chains 25 and 26 thus forming an endless path around the respective sprockets. Sprockets 34 and 35 are mounted on a common shaft 40 which is positively driven by a power source 41 by means of a common chain and sprocket arrangement 42.

Frame 10 is provided with opposed support plates 45 and 46 which are vertically mounted on channel beam 21 and longitudinal beam 19 and channel beam 22 and longitudinal beam 20, respectively. Support plates 45 and 46 have journalled therein shaft 47; also, support plates 45 and 46 are respectively provided with identical face groove cams 50 and 51 which are securely mounted thereon and through which pass shaft 47 in a concentric relationship. Shaft 47 is further provided with star wheels 52 and 53 which are rigidly mounted thereon adjacent face groove cams 50 and 51, respectively. Star wheel 53 is identical to star wheel 52; therefore it is only necessary to describe one in detail. Star wheel 53 is comprised of a center portion 54 which is received by shaft 47 and board engaging radial star wheel arms 55, 56, 57 and 58. The face of each arm is substantially L-shaped so as to receive and stop the forward movement of a board which it is to lift and turn. Arms 55, 56, 57 and 58 are respectively provided with cam operated arms 59, 60, 61 and 62 which are pivotally mounted on pins 63, 64, 65 and 66, respectively. Cam operated arms 59, 60, 61 and 62 have rollably mounted thereon cam followers 67, 68, 69 and 70, respectively, which normally reside in track 71 of face groove cam 51. As star wheel 53 and shaft 47 turn relative to face groove cam 51, cam operated arms 59, 60, 61 and 62 are advanced and retracted relative each respective star wheel arm by means of the cam followers travelling in track 71 of cam 51.

Shaft 47 and star wheels 52 and 53 are incrementally turned by means of pneumatic cylinder 80, pawl 81 and ratchet wheel 82. Pneumatic cylinder 80 is pivotally mounted on support 83 which in turn is rigidly mounted on longitudinal beam 19. Pneumatic cylinder 80 includes a piston rod 84 which is slidably mounted therein and air feed lines 85 and 86 which are connected to a pneumatic pressure source and which admit air into cylinder 80 and positively energize piston rod 84 in either the inward or the outward direction. The end of piston rod 84 is pivotally mounted on shaft 87 which in turn is securely mounted in the extending end of pawl 81. Pawl 81, which is rotatably mounted on shaft 47, is provided with a small rod 89 which pivotally mounts a spring loaded catch 88. Pawl 81 further has an elongated slot 90 which is adapted to slidably receive a stake 91, stake 91 being securely mounted on spring loaded catch 88 and extending through slot 90 to be connected to a spring 92 which exerts a tension force on stake 91 thus causing catch 88 to be rotated inwardly. It can be seen that spring loaded catch 88 is adapted to slide on the outer surface of ratchet wheel 82 and engage a selected tooth 93 thereof and to rotate ratchet wheel 82 about its axis a distance upon the energization of pneumatic cylinder 80 to force piston rod 84 outwardly.

The stop mechanism by which only one board is fed into the star wheels at a time is comprised of lifting mechanisms 102 and 103 which are identical in function and design and only one of which is described and stakes 100 and 101 which are respectively fixedly mounted on the inside of channel beams 21 and 22 and positioned to extend upwardly above the upper edges thereof so as to engage and stop a board as the same is carried on the continuously moving chains 25 and 26. Lifting mechanism 103 is comprised of a pneumatic cylinder 104 and a piston rod 105 which is slidably mounted in cylinder 104 and is adapted to be raised by means of pressurized air entering lines 106 and 111. The end 107 of piston rod 105 is clevis or U-shaped and rotatably mounts a pinion sprocket 108 by means of shaft 109. Cylinder 104 is securely mounted on longitudinal beam 20 and U-shaped end 107 of piston rod 105 resides in an opening 110 formed in channel beam 22 whereby sprocket 108 is adapted to meshingly engage chain 26. Upon energization of cylinder 104, piston 105 is raised thus raising chain 26 which is in motion above the level of stake 101 and adapting a board to pass over the same and into the area adjacent star wheels 52 and 53.

The operation of the apparatus comprising this invention will be described with respect to a selected board as it proceeds through the various stages as provided by this invention. A board 120 is placed on continuously moving chains 25 and 26 and is carried thereby until it reaches stakes 100 and 101 where it temporarily stops while the chains slide against its bottom surface. Board 120 is raised into position 120a by means of lift mechanisms 102 and 103 which push chains 25 and 26 upwardly so that board 120 may clear stakes 100 and 101. As chains 25 and 26 transport board 120 toward star wheels 52 and 53, the operator may inspect the leading edge thereof afterwhich it engages selected star wheel L-shaped arms of star wheels 52 and 53 and remains temporarily at rest. The operator then energizes pneumatic cylinder 80 which forces piston rod 84 outwardly whereby shaft 47 is rotated by pawl 81 engaging and rotating ratchet wheel 82 a full quadrant. As board 120 moves into position 120b, selected cam operated arms advance relative to their mating star wheel arms and engage the trailing edge of board 120. Upon the rotation of ratchet wheel 82, the operator may inspect the rearward edge of board 120 as it enters position 120c. During the rotation of board 120 into position 120c, a selected pair of cam operated arms rapidly advance relative to their respective star wheel arms to a position of engagement with board 120 as shown at 120c. At position 120c, board 120 is adapted to be tipped into position 120d upon the next rotation of ratchet wheel 82 by means of the energization of cylinder 80. Thus, the operator is able to inspect the former bottom surface of board 120 when board 120 moves from position 120d to 120e. As star wheels 52 and 53 are further rotated by the operator, the selected cam operated arm decelerates relative its companion star wheel arm so as to adapt the same to engage another incoming board.

The apparatus according to this invention is adapted to handle several boards simultaneously in that as one board is being received by selected star wheel arms, another board may be positioned vertically by other selected star wheel arms. Also, it is contemplated that lift means 102 and 103 may receive their pressurized pneumatic fluid from a source which is common with that source which supplies pneumatic cylinder 80 so that when the operator energizes cylinder 80 whereby star wheels 52 and 53 are rotated approximately 90 degrees, lift means 102 and 103 simultaneously raise chains 25 and 26 above stakes 100 and 101 to allow passage of a board over the same. Thus, as each star wheel arm releases a particular board, another set of star wheel arms is positioned to receive an incoming board. By manually controlling the various air cylinders, the operator may adjust the speed of inspection to his own ability and may also stop the mechanisms involved for any desired period of time.

While the preferred embodiment of the invention has been disclosed, it is to be understood that changes and variations may be made without departing from the spirit and scope of this invention as defined by the appended claims.

I claim:

1. An apparatus for receiving boards from a book of lumber and for presenting all surfaces of a selected board to an observer for inspection of the same comprising:
   (a) a structural frame adapted to rest on a surface for supporting said apparatus;
   (b) chain means continuously movable across said structural frame in a predetermined path and adapted to receive and transport said selected board; and
   (c) board inverting means mounted on said frame and partially in said path for lifting said selected board off of said chain means and for inverting the same, said inverting means comprising:
      (1) a shaft rotatably mounted in said frame and positioned transversely with respect to said path;
      (2) star wheel means securely mounted on said shaft and including a plurality of integral and radially extending board receiving arms and a plurality of pivotally mounted arms in substantial radial alignment with and connected to said integral arms, said pivotally mounted arms adapted to be radially advanced and retracted relative to said integral arms; and
      (3) means for incrementally rotating said shaft whereby said selected board is lifted from said chain means by said integral arms and inverted by said pivotally mounted arms advancing past said integral arms and engaging said selected board.

2. The apparatus of claim 1 wherein said frame is provided with means for cooperating with said chain means to meter the flow of boards from said book of lumber, said metering means including stop means mounted in said chain means path for engaging said selected boards and for preventing the movement thereof along said path; and lifting means mounted on said frame and engaging said chain means, said lifting means being adapted to raise and lower said chain means while in movement along said path whereby said selected board clears said stop means and is moved by said chain means to said board inverting means.

3. The apparatus of claim 2 wherein said lift means is provided with a power means for energizing the same, said power means being adapted to cooperate with said rotating means whereby when said shaft rotating means incrementally rotates said star wheel means, said lifting means raises said chain means to allow passage of said selected board over said stop means.

4. The apparatus of claim 1 wherein said star wheel means includes cam means rigidly mounted on said structural frame and in concentric alignment with said shaft; and cam follower means being provided for said pivotally mounted arms and in communication with said cam means whereby upon the incremental rotation of said shaft, said pivotally mounted arms advance and retract relative said integral arms.

5. The apparatus of claim 4 wherein said means for incrementally rotating said shaft is comprised of a ratchet wheel rigidly mounted on said shaft, a pawl pivotally mounted on said shaft adjacent said ratchet wheel and adapted to engage and incrementally turn said ratchet wheel and pneumatic means mounted on said frame and pivotally connected to said pawl for positively reciprocating the same through a given arc.

6. The apparatus of claim 3 wherein said star wheel means includes cam means rigidly mounted on said structural frame and in concentric alignment with said shaft; and cam follower means being provided for said pivotally mounted arms and in communication with said cam means whereby upon the incremental rotation of said shaft, said pivotally mounted arms advance and retract relative said integral arms.

7. The apparatus of claim 6 wherein said means for incrementally rotating said shaft is comprised of a ratchet wheel rigidly mounted on said shaft, a pawl pivotally mounted on said shaft adjacent said ratchet wheel and adapted to engage and incrementally turn said ratchet wheel and pneumatic means mounted on said frame and pivotally connected to said pawl for positively reciprocating the same through a given arc.

8. An apparatus for receiving boards from a book of lumber and presenting all surfaces of a selected board to an observer for inspection of the same comprising:
   (a) a structural frame adapted to rest on a surface for supporting said apparatus;
   (b) chain means continuously movable across said structural frame in a predetermined path and adapted to receive and transport said selected board;
   (c) means cooperating with said chain means for metering the flow of boards from said book lumber, said metering means including:
      (1) stop means mounted in said path of said chain means for engaging said selected board and for preventing the movement thereof along said path;
      (2) lifting means mounted on said frame and engaging said chain means, said lifting means being adapted to raise said chain means while in movement along said path above said stop means to selectively allow passage of said selected board; and
      (3) power means connected to said lifting means for selectively energizing said lifting means;
   (d) a shaft rotatably mounted in said frame and positioned transversely with respect to said path;
   (e) power means for incrementally rotating said shaft comprising:
      (1) a ratchet wheel rigidly mounted on said shaft, said ratchet wheel having a selected number of integral and outwardly extending teeth;
      (2) a pawl rotatably mounted on said shaft adjacent said ratchet wheel, said pawl adapted to engage a selected tooth of said ratchet wheel and to rotate said ratchet wheel through an incremental arc; and
      (3) a power cylinder mounted on said frame and pivotally connected to said pawl for positively oscillating said pawl through said incremental arc whereby said shaft is rotated; and
   (f) board inverting means mounted in said path for lifting said selected board off of said chain means and for inverting the same, said board inverting means comprising:
      (1) star wheel means securely mounted on said shaft and including a number of integral and radially extending star wheel arms adapted to engage and elevate said selected board relative said chain means;

(2) a pivotally mounted arm provided for and pivotally mounted on each star wheel arm and adapted to engage and tilt said selected board relative said star wheel arm, said pivotally mounted arm including a cam follower; and
(3) cam means rigidly mounted on said frame and in concentric alignment with said shaft, said cam means communicating with said pivotally mounted arms by means of said cam followers whereby upon the incremental rotation of said shaft, selected cam operated arms are adapted to be advanced, retracted and to remain stationary relative said star wheel arms.

No references cited.

EVON C. BLUNK, *Primary Examiner.*

M. L. AJEMAN, *Assistant Examiner.*